Feb. 17, 1942.   A. MILLER   2,273,058
AUTOMATIC SAFETY CONTROL
Filed Feb. 4, 1938   3 Sheets-Sheet 1

INVENTOR.
ARTHUR MILLER
BY Paul A. Talbot
ATTORNEY

Feb. 17, 1942.  A. MILLER  2,273,058
AUTOMATIC SAFETY CONTROL
Filed Feb. 4, 1938  3 Sheets-Sheet 2
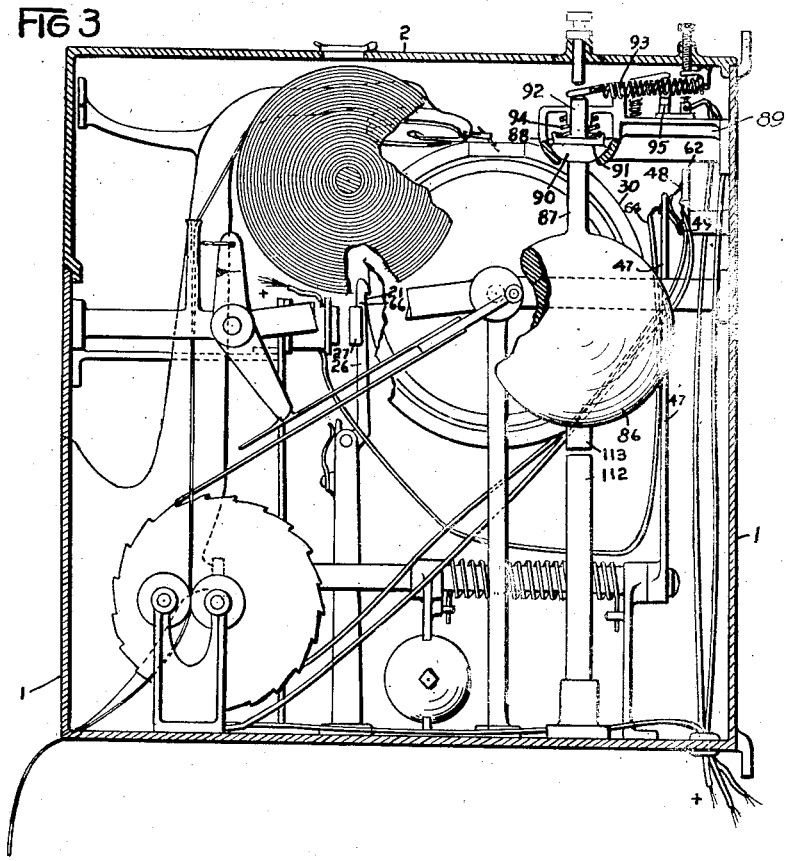
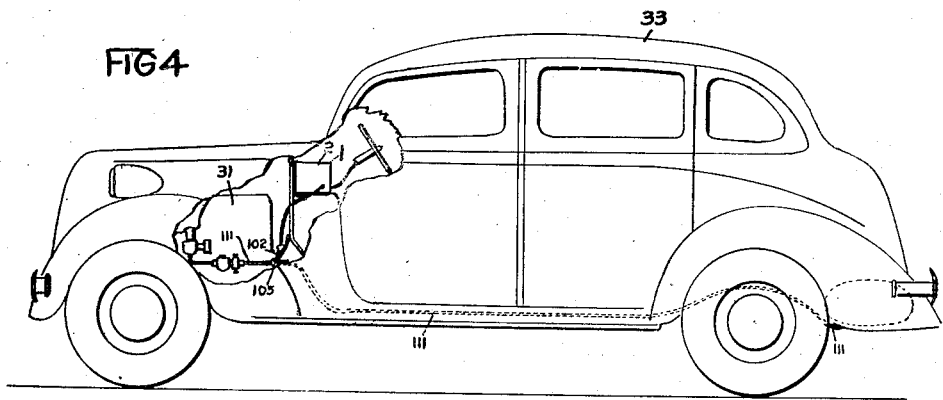
INVENTOR.
ARTHUR MILLER
BY
Paul A. Talbot
ATTORNEY

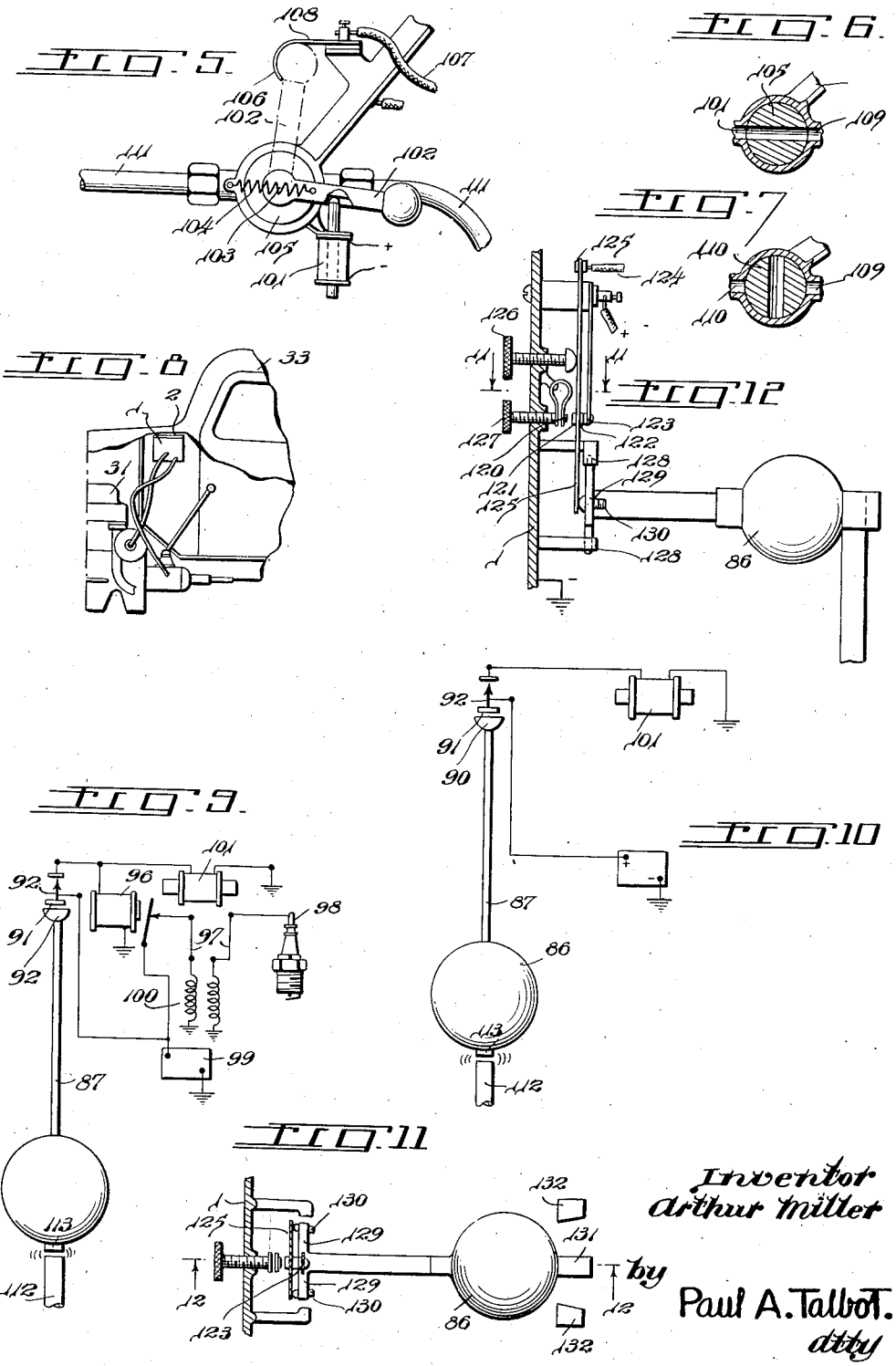

Patented Feb. 17, 1942

2,273,058

UNITED STATES PATENT OFFICE 2,273,058

AUTOMATIC SAFETY CONTROL

Arthur Miller, Leavenworth, Kans.

Application February 4, 1938, Serial No. 188,703

14 Claims. (Cl. 180—82)

My invention is a device for controlling vehicles, air ships, trains, locomotive engines, and other moving conveyances and particularly to a device to prevent accidents by limiting the speed or stopping the vehicle and controlling the conveyance even though the operator may be inexperienced or careless. A divisional application including matter disclosed herein was filed by me December 22, 1939, Serial Number 310,494. Among the purposes and objects of my invention are:

A curve speed controlling device which stops or checks the speed of the conveyance when exceeding the safe speed for the particular curve being made.

A device preventing fires when t' conveyance collides, overturns or is otherwise out of normal condition or function.

To inform the operator the safe conditions for operating the conveyance without taking his attention or sight from the path of travel.

A simple device for controlling the safety of travel of all forms of conveyances.

A device which is constructed for universal application to all forms of conveyances.

I accomplish these and other objects by the construction herein described and shown in the accompanying drawings forming a part hereof in which:

Fig. 3 is a sectional end elevation of my device.

Fig. 4 is a general view showing one of the applications of my device.

Fig. 5 is a fragmentary detail of the fuel shut off.

Figs. 6 and 7 are fragmentary details of the fuel control valve.

Fig. 8 is a fragmentary view of a modification of the operating or driving mechanism of my device.

Fig. 9 is a wiring diagram of the collision curve and accident fire prevention control.

Fig. 10 is a wiring diagram of a modification of an independent fire control.

Fig. 11 is a sectional detail of my curve control at 11—11 Figure 12.

Fig. 12 is a section at 12—12 Figure 11.

Figure 1:
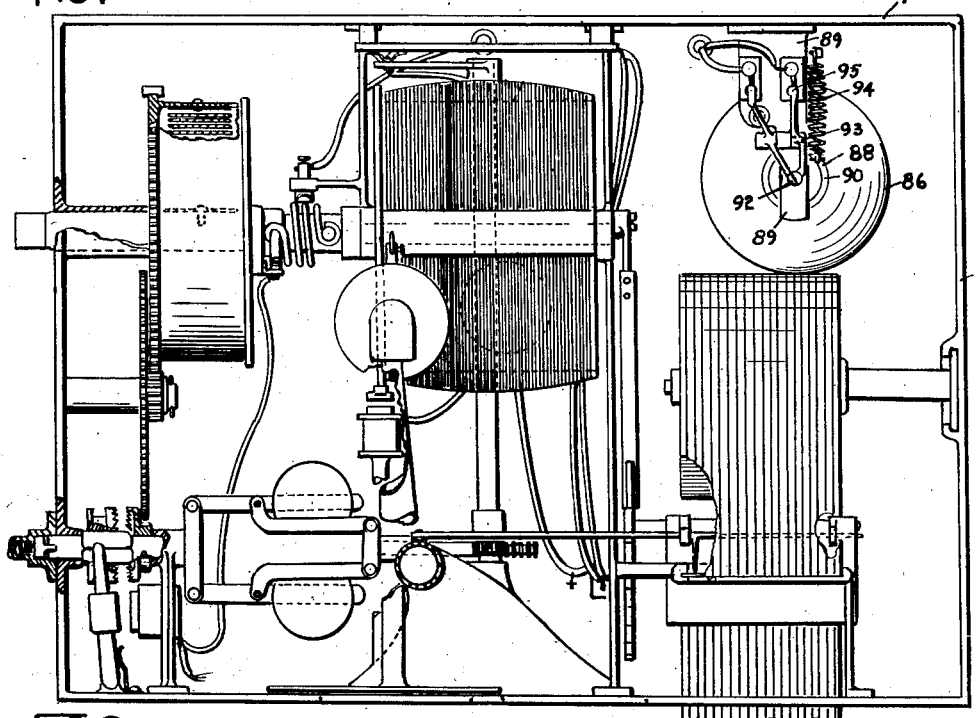
Fig. 1 is a plan view of my device.
Figure 2:
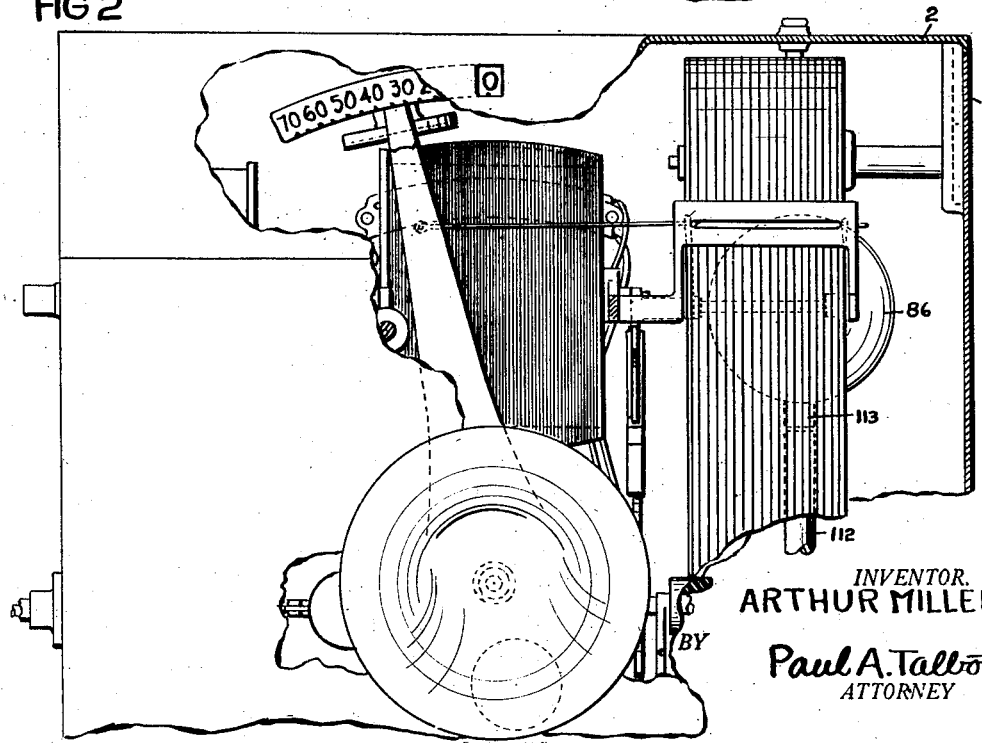
Fig. 2 is a front elevation and partial section of my device.

While I have herein shown modifications of some of the parts of my device, it will be apparent after studying the disclosure herein that numerous changes may be made in the detailed construction to suit different conditions of operation, and also to accomplish the equivalent results and functions of the parts.

In the specification to follow one of the constructions is described in detail and its simplified form so that it may be more easily understood.

Similar reference characters refer to similar parts throughout the several views of the drawings and in the specification to follow.

Accidents are usually the result of incompetence or carelessness of the operator of conveyances. The loss of life and damage resulting from accidents in many cases may be minimized by fire prevention and/or the instant stopping of the propelling mechanism of conveyances.

The lack of experience or judgment of operators may be compensated for by the use of my device, by telling the operator that the speed being traveled is too great for safety. My device gives a warning about the speed and that it may be too fast or is approaching a dangerous point for the road condition which may be curved.

The sharpness of the curve as well as the banking provided are often miscalculated by operators and my device may be so set that the car will be slowed or stopped when the speed around a curve is too great for safety.

The many other advantages of my device will be seen after a better understanding of its construction and uses. The modification of many of its parts will at once be obvious to persons skilled in mechanical and electrical mechanisms and I do not wish to be limited to the specific construction herein described. For instance the arrangement of the parts as well as their number and size and type may in many instances be altered without diminishing the usefulness of purpose for which they are intended.

This specification, for the purpose of clarity and that my invention may be better understood, is limited in its description and generally is confined to the details shown rather than to the numerous equivalent constructions which may produce a desired function.

My device preferably comprises a housing 1 into which many of the parts are assembled. The housing is provided with a removable top 2 and such other openings, doors, etc. as may be desirable in caring for or replacing the parts and for inspection.

The curve, collision and fire control of my device comprises the pendulum weight 86 swingingly mounted on the arm 87 supported to swing in its socket 88 and bracket 89 secured to the housing 1. The flat upper surface of the ball segment 90 to which the arm 87 is secured engages the flat under surface 91 of the switch plunger 92 so that the movement of the arm 87 will force the switch lever over the dead center of the pin 93 on which it oscillates causing the spring 94 to carry the switch arm against the contact 95 and energizing the relay 96 to break the ignition circuit 97 thereby stopping the engine. Of course the same mechanism can be made to short the ignition system instead of breaking the circuit if desired. The breaking of the circuit may be understood by referring to Figure 9 of the drawings in which one of the spark plugs 98 is shown as receiving current from the battery 99 after passing through the usual coil 100. I have not shown all of the details of the ordinary ignition system commonly used in firing gasoline engines as this system is known by anyone familiar with the operation of such engines.

In addition to stopping the engine from firing I have provided a means of shutting off the feed from the engine to prevent fire and also to stop engines having no electric ignition system as for instance Diesel, or oil engines, or steam engines.

The fuel shut off control may be combined with the ignition control or separate from it as shown in Figure 10 of the drawings and comprises a switch operated by the switch plunger as above described which energizes the solenoid 101 which as may be seen in Figures 5, 6 and 7 of the drawings, forces the fuel valve lever 102 over the center 103 causing the spring 104 to further move the valve 105 to the closed position as shown in Figure 7.

In Figure 5, I have shown a contact spring 106 connected to the ground on negative side of the ignition circuit upon contact with the lever 102. The positive ignition conductor 107 is insulated from the bracket and valve by the insulator 108.

The valve 105 may be connected through its inlet port 109 and discharge port 110 to the fuel line 111 for any type of engine using liquid fuel.

To prevent the weight 86 from swinging too freely I have provided a magnet 112 secured to the housing 1 and affecting the boss 113 of magnetic material secured to the weight 86. Thus until the forces of motion of the conveyance become great enough to overcome the magnet such as taking a curve too fast, an abrupt stop or start or when the conveyance may be overturned the weight will remain at rest and will not affect the electric circuits as above described.

An unusual motion of the conveyance causes the weight to move and shut off fuel and/or ignition. Aeroplanes, air ships and vessels at sea may be controlled by my device and it may be improved and modified to suit any conveyance.

In Figures 11 and 12 I have shown the curve control mechanism so constructed as to provide an adjustment which enables the operator to pre-determine the limit of speed the conveyance may travel around curves. The ignition system may be either shorted or the circuit completed by shorting to the ground or negative side of the circuit by the contact of the yielding adjustable switch points 120 and the movable point 121, or the movable point 122 may be separated from the yielding point 123 with which it is normally held in contact until the circuit is broken and the engine stopped by breaking the ignition circuit.

The movable points 121 and 122 are supplied with current through the ignition wire 124 connected to the spring 125 on which said points are mounted.

The spring 125 rests against and controls the swinging of the weight 86 restraining its movement until the tension of the spring is overcome as is the case when the conveyance travels at a greater speed around a curve than the spring tension is set for, which may be adjusted by the screw 126. The contact 120 may be adjusted by means of the screw 127.

The weight 86 may be vertically mounted as shown in Fig. 3 or may be swingingly mounted in the bearings 128 horizontally as shown in Figs. 11 and 12 and the arms 129 may be provided with the adjustable contact screws 130 which bear against the spring 125.

The pole piece 131 secured to the weight 86 is preferably positioned to engage the magnets 132 at either extreme of travel of the weight 86 when said weight is held while the ignition has remained off and the engine thereby slowed down and the speed of the conveyance reduced to a point where the spring 125 will restore the weight to its normal central position and the engine again resumes functioning and the control of the speed of the conveyance again turned over to the operator.

The restraining effect preventing the freedom of movement of the weight 86 by means of a magnet either at the ends of its travel in swinging or to prevent it from swinging easily and freely may be of course accomplished by various forms of magnets for instance, a bipolar horseshoe type permanent magnet may be used or a bar magnet in which but one of its poles is used on an energized magnet are all types which may be suitable for preventing the pendulum tendency of the weight and to restrain movement either with a spring or without it. Adjustable friction devices as well as adjustable springs may likewise restrain movement of the weight 86 in the turn control or collision control. The appended claims set forth my invention.

While I have herein described in detail the construction and operation of one form of my device it may be obvious after a study of this description to alter and add to the parts to suit them to the many uses to which my invention may be suited. I therefore do not wish to be limited to any specific construction as I may wish to depart therefrom within the scope of the appended claims which set forth my invention.

I claim:

1. In a control for a conveyance having a housing secured thereto and a weight movably mounted therein and switch means electrically connecting said switch means to the engine propelling said conveyance to stop the engine by the movement of said weight, magnetic means restraining the movement of said weight and coacting with gravity in returning said weight and said switch means to the normal operating position.

2. In a control for a conveyance, a housing secured to the conveyance and means therein comprising a weight swingingly mounted in said housing affected by the motion of the conveyance and switch means operated by said weight for controlling the propelling means of said conveyance and a magnet affecting said weight and said controlling means preventing the operation of said controlling means during the normal operation of the conveyance, said magnet coacting with said weight in restoring said controlling means to normal operation after abnormal operation of said conveyance.

3. In a conveyance control, driving means for said conveyance, a movable weight attached to said conveyance and switch means connected to and operated by said weight to operate and to control the speed of said conveyance by controlling said driving means, a magnet restricting the movement of said weight and cooperating with gravity in returning said weight to its normal operating position.

4. In a conveyance control, a weight swingingly mounted in said conveyance, a magnet, and a pole piece secured to said weight affected by said magnet to center and hold said weight in its operative position, an electric circuit and propelling means for said conveyance controlled by said electric circuit, and switch means and adjusting means therefor adjusting the breaking of said electric circuit in relation to the swinging of said weight.

5. In a conveyance control, a weight swingingly mounted in said conveyance and a pole piece secured thereto, a magnet affecting the movement of said weight by said pole piece, an electric ignition circuit and propelling means for said conveyance controlled by said electric circuit and switch means operated by said weight and means adjusting the breaking of said electric circuit in relation to the swinging of said weight, said magnet restraining the movement of said weight.

6. In a conveyance control, a weight swingingly mounted in said conveyance and a pole piece secured thereto, a magnet affecting the movement of said weight by said pole piece, an electric ignition circuit and propelling means for said conveyance controlled by said electric circuit and switch means operated by said weight and means adjusting the breaking of said electric circuit in relation to the swinging of said weight, said magnet restraining the movement of said weight and a spring returning said weight to its normal operating position.

7. In a device to regulate the speed of conveyances while traveling around curves, a weight mounted in said conveyance and moved by the velocity of the conveyance when exceeding normal safe speed around curves, adjustable spring means controlling the movement of said weight whereby the speed of the conveyance is automatically controlled and magnet means restraining gravity in the movement of said weight and the pressure of said spring near the extremes of travel of said weight.

8. In a conveyance control, driving means for propelling said conveyance, a movable weight attached to and moved by the movement of said conveyance, means connected to and operated by said weight to stop the motion of said driving means and a magnet resisting the movement of and adapted to cooperate with gravity to return said weight to its normal position when said conveyance is in its normal operation.

9. In a conveyance control, a movable weight secured to and affected by the position and movement of the conveyance, driving means and an ignition system for said driving means to control the operation thereof, switch means operated by said weight and electrically connected to said ignition system whereby said ignition system is made inoperative and operative by the movement of said weight and said conveyance and a magnet retarding the movement of said weight.

10. In a conveyance control, driving means for said conveyance, a movable weight attached to said conveyance and moved by centrifugal force by the dangerous speed of said conveyance around turns, means connected to said weight to restrict and control the motion of said driving means of said conveyance, and a magnet restricting the movement of said weight and restoring the said controlling means when said conveyance is in normal safe operation.

11. In an engine control for conveyances, an electric circuit controlling the engine and a weight moved by the speed of the conveyance around curves and by the tipping over of said conveyance, said weight adapted to control said electric circuit and thereby said engine, and a spring returning said weight to its normal position for the operation of said engine and a magnet holding said weight out of its normal position when said conveyance is not in its normal operating condition.

12. In a control for a conveyance having a motor, a housing secured to the conveyance, a weight movably mounted in said housing and affected by the position of said conveyance, magnetic means in the housing restricting the movement of said weight, and means operated by said weight to shut off the fuel and ignition to the motor of said conveyance when the latter is out of normal position, and to restore the fuel and ignition when said conveyance is in normal perpendicular position.

13. In a device to regulate the speed of a conveyance while traveling around curves, driving means for said conveyance and means controlling said driving means comprising a weight mounted in said conveyance and moved by the velocity of the conveyance when exceeding a normal safe speed around curves, and a magnet preventing the free movement of said weight from its normal operative position in controlling said driving means.

14. In a device to regulate the speed of a conveyance while traveling around curves, an engine driving the conveyance and means controlling said engine comprising a weight mounted in said conveyance and moved by the velocity of the conveyance when exceeding a normal safe speed around curves, and a magnet preventing the free movement of said weight and co-acting with gravity to return said weight to its normal position to restore said engine to its normal operation.

ARTHUR MILLER.